US005769949A

United States Patent [19]
Cienkus et al.

[11] Patent Number: 5,769,949
[45] Date of Patent: Jun. 23, 1998

[54] AUTOMATED COATING PROCESS

[75] Inventors: William J. Cienkus, Crete; Stephen A. Gourley, Frankfort; Frank L. Corral, Crete, all of Ill.

[73] Assignee: CHS Acquisition Corp., Chicago Heights, Ill.

[21] Appl. No.: 640,548

[22] Filed: May 2, 1996

[51] Int. Cl.$^6$ .................................................. B05B 5/025
[52] U.S. Cl. .......................... 118/621; 118/308; 118/324; 118/620; 118/629; 118/641; 118/642; 118/686; 198/465.2; 198/465.4; 198/687.1
[58] Field of Search .................................... 118/308, 324, 118/620, 621, 629, 641, 642, 686; 198/465.2, 465.4, 687.1; 134/70

[56] References Cited

U.S. PATENT DOCUMENTS

| | | | |
|---|---|---|---|
| 4,009,301 | 2/1977 | Heckman et al. | 118/642 |
| 4,084,684 | 4/1978 | Skinner, II | 198/465.4 |
| 4,378,741 | 4/1983 | Nagahori | 198/465.1 |
| 4,473,935 | 10/1984 | Tatsuura et al. | 198/465.1 |
| 5,065,678 | 11/1991 | Rhodes | 198/465.1 |
| 5,115,758 | 5/1992 | Suzuki et al. | 118/621 |
| 5,299,680 | 4/1994 | Rhodes | 198/465.2 |
| 5,382,450 | 1/1995 | Salisbury | 427/195 |

OTHER PUBLICATIONS

Anon, "Thirty Paths to a Painted Finish", Products Finishing, v. 52, No. 6, pp. 116–117, Mar. 1988.

*Primary Examiner*—Donald E. Czaja
*Assistant Examiner*—Michael P. Colaianni
*Attorney, Agent, or Firm*—Jones, Day, Reavis & Pogue

[57] ABSTRACT

A system for applying a coating to an article of manufacture comprises a first conveyor assembly which conveys articles through a coating booth for application of a coating. The first conveyor assembly has a section aligned with and in close proximity to a section of a second conveyor assembly at which the articles are transferred to the second conveyor assembly. The second conveyor assembly transports the articles to a bake oven wherein the coating is baked on the articles. By this arrangement, residual coating material is not baked on the carriers of the first conveyor assembly and hence coating removal processes to clean the carriers are avoided.

21 Claims, 13 Drawing Sheets

FIG. 27

AUTOMATED COATING PROCESS

BACKGROUND OF THE INVENTION

1. Field of the Invention

The present invention relates generally to an automated process for coating articles of manufacture and, more particularly, to an apparatus and process wherein articles to be powder coated are transferred between conveyor systems such that deposited powder is not baked onto conveyor parts and, therefore, the expense of cleaning and/or replacing conveyor parts is avoided.

2. Description of the Prior Art

In the construction of numerous articles of manufacture, it is frequently required that the article have a finished appearance. Consequently, numerous processes are known for providing surface finishes on articles. In the construction of articles made from materials which can corrode during use, it is often desirable to finish the article with a protective coating which not only extends the life of the finished product but also enhances its appearance.

Many materials are known for providing coatings on articles of manufacture. So too are many processes known for such purposes. One such process which has gained wide acceptance in recent times is known as powder coating. In powder coating, an article to be finish-coated is conveyed into a powder booth and is sprayed with an electrically charged powder which adheres to the article by reason of a differential in electrical potential between the article and the powder. The article then exits the powder booth and is conveyed to an oven where it is heated to a suitable temperature such that the powder gels and mechanically bonds to the article. When the article is cooled the coating hardens.

Powder coating processes can offer considerable advantages over prior coating methods such as painting. In painting, which is typically done in a spray booth, it is often difficult to coat an article uniformly with paint, particularly if the article has a complex shape. Care must also be taken to avoid spraying the article with too great a paint concentration as to create runs in the paint coating. Further, there is typically considerable waste of material in a spray painting process. A powder coating process, on the other hand, offers the benefits of applying a uniform thickness coat of material on even the most complex-shaped articles. Material waste also can be greatly minimized. Moreover, the surface finish of a powder coated article is often far superior in quality to a spray painted article. For articles which are coated for purposes of corrosion resistance, a powder coating process achieves exceptional results. Further, powder coating offers considerable advantages over painting processes by greatly minimizing the release to the environment of volatile compounds.

Powder coating of articles of manufacture can be suitably performed using a conveying apparatus to transport articles continuously through a powder booth and then on to a baking oven. However, a disadvantage of such a system is that the article must be supported from some type of transportable carrier through the powder booth and on through the oven. In such a process, it is inevitable that powder spray is deposited on and baked on the transport carrier. As a consequence, with repeated cycles of successively transporting a carrier through the powder coating process, excessive accumulations of coatings will be built-up on the carrier mechanism. In powder coating, this build-up of coating is unacceptable because the carrier must be capable of making electrical contact with the part to be coated. Excessive build-up of coating material on the carrier at some point will cause discontinuity of electrical conduction between the article and its associated carrier, thereby adversely affecting the coating quality.

To avoid the problem of excessive build-up of coating material on the transport carrier, several methods may be practiced to clean the carriers of baked-on powder coating. In one such method, the conveyor system may route the empty carriers after removal of the associated part to a salt bath or other stripping chemical. In another method, the paint may be burned off the carrier. In another complete alternative, the coated carrier component or assembly is simply discarded and replaced when coating build-up has reached an unacceptable level. Naturally, all of these methods add expense and potential downtime to a powder coating process.

Accordingly, it is desirable to provide an apparatus and process for powder coating articles of manufacture in a manner such that associated article carriers are not subject to accumulation of baked-on coatings and hence need to be periodically stripped of coating material or otherwise discarded. It is further desirable to provide such an apparatus and process which is a continuous process capable of coating articles at a relatively high rate of speed without appreciable down time. Still further, it is desirable to provide such an apparatus and process which involves the use of functionally reliable and easily maintained assembly components such that the process can be performed reliably with minimal expense of labor.

SUMMARY OF THE INVENTION

The present invention overcomes the disadvantages of the prior art by providing a coating system comprising three conveyor assemblies each designed to transport carriers about a separate closed path. A first conveyor assembly has a section aligned longitudinally with a second conveyor assembly to define a first article transfer station. Articles are thereby loaded on carriers supported by the first conveyor assembly and are transported to the first transfer station where the carriers are moved into synchronous alignment with carriers of the second conveyor assembly. The carriers of the second conveyor assembly thereupon lift the articles off of the carriers of the first conveyor assembly and the articles are thereupon transported to a coating booth. Once coated, the articles are transported to a second transfer station whereupon they are transferred to the third conveyor assembly and subsequently pass through a bake oven. Because the carriers of the second conveyor system are never exposed to the bake oven, the coating deposited on these carriers as the articles are being coated is not baked on such that the carriers require periodic cleaning or discarding.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENTS

Figure 1:
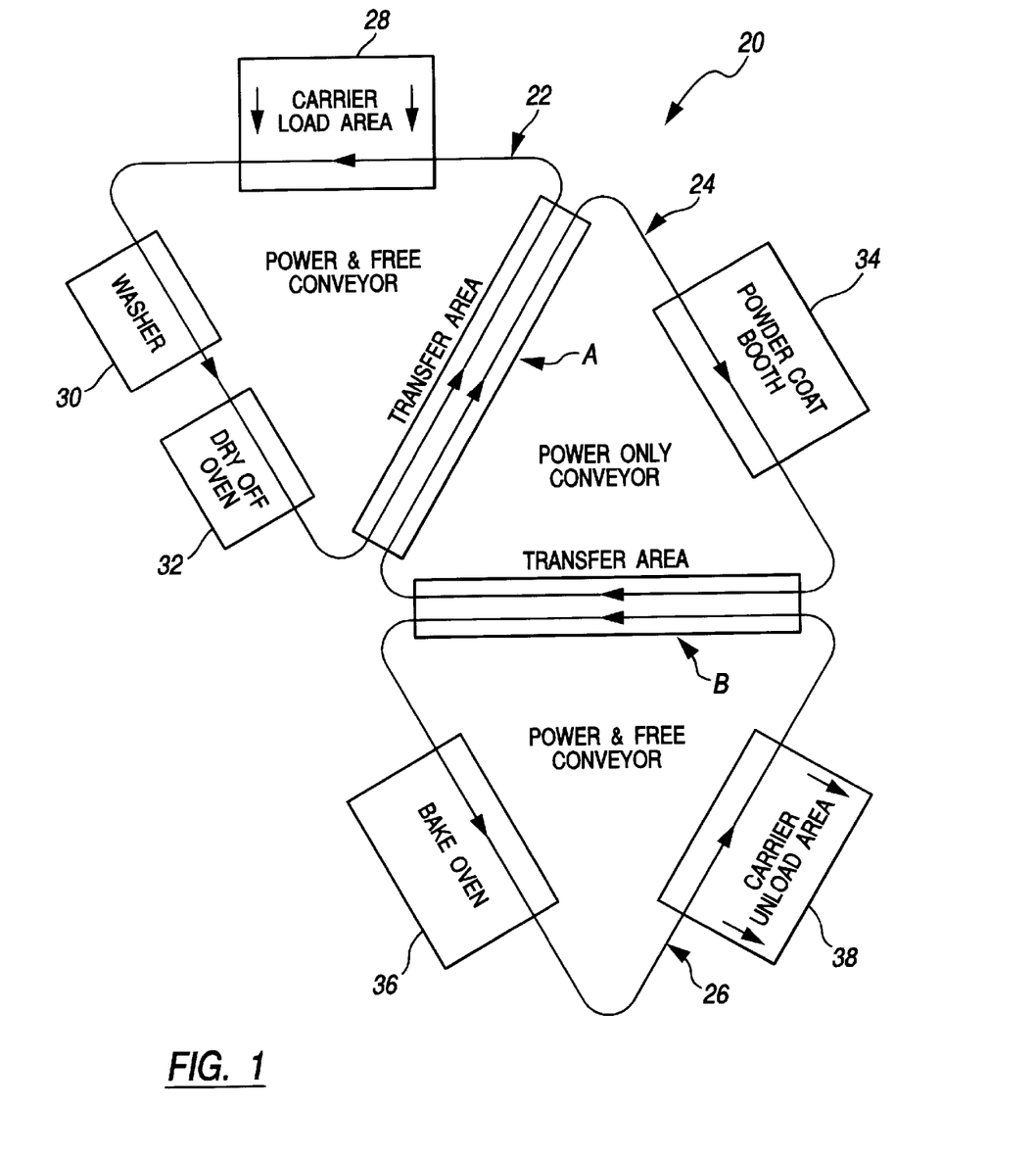
FIG. 1 is a schematic view of a coating system constructed in accordance with the principles of the invention.

Referring now to the drawings, and initially to FIG. 1, a system for powder coating articles of manufacture is shown schematically and designated generally by the reference numeral 20. The system 20 includes as its principal components a first endless conveyor assembly 22 designed to transport articles around a first predetermined path, a second endless conveyor assembly 24 designed to transport articles around a second predetermined path and a third endless conveyor assembly 26 designed to transport articles around a third predetermined path. Preferably, the conveyor assemblies 22, 24 and 26 are all overhead assemblies constructed of a roller track system as will be described in detail hereinafter.

In the direction of travel of the first conveyor assembly 22, the system 20 includes a loading station 28 at which articles to be powder coated are loaded on the conveyor. The system 20 may next include a washer apparatus 30 for removing oil and dirt from the transported articles. Following the washer 30 is a dryer apparatus 32. The articles next are transported to a first transfer station A at which a section of conveyor assembly 22 is aligned longitudinally with and in closely spaced relation to a section of conveyor assembly 24. As will be hereinafter described in detail, the articles are then transferred to conveyor assembly 24 and are thereafter transported to a powder coating booth 34. By conventional means the articles are powder coated in the booth 34 and are thereafter transported to a second transfer station B. This station B is constructed substantially identical to the transfer station A and includes a section of the conveyor assembly 24 longitudinally aligned with and in closely spaced relation to a section of the conveyor assembly 26. The articles are thereupon transferred to the conveyor assembly 26 whereafter they pass through a suitable bake oven 36. The bake oven causes the powder coating to gel on the conveyed articles. After cooling, the articles are removed from the conveyor assembly 26 at an unloading station 38.

Figure 2:
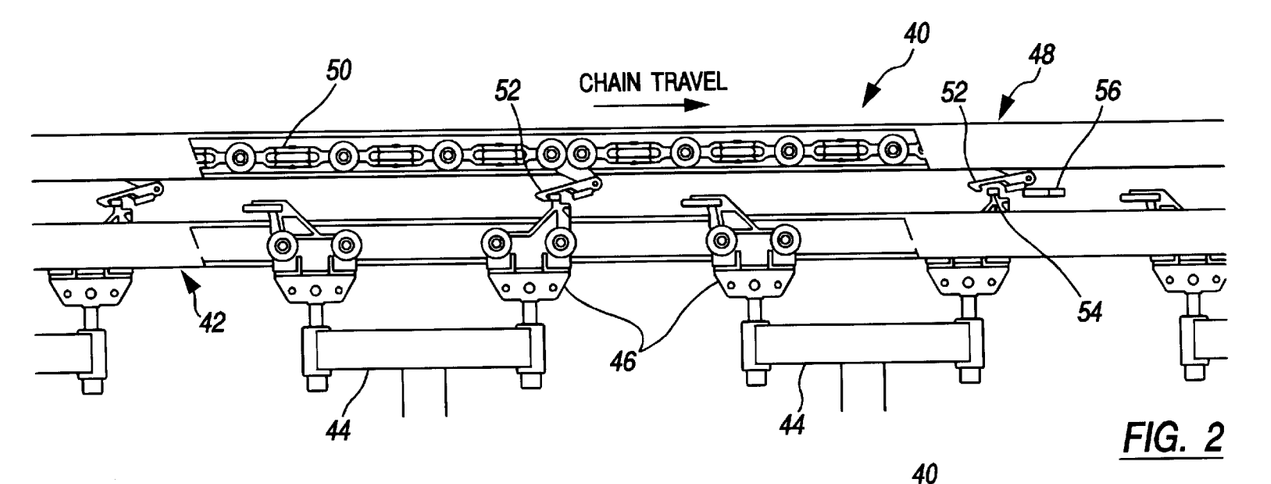
FIG. 2 is a side view of a conveyor assembly section known in the prior art as a power and free conveyor.
Figure 3:
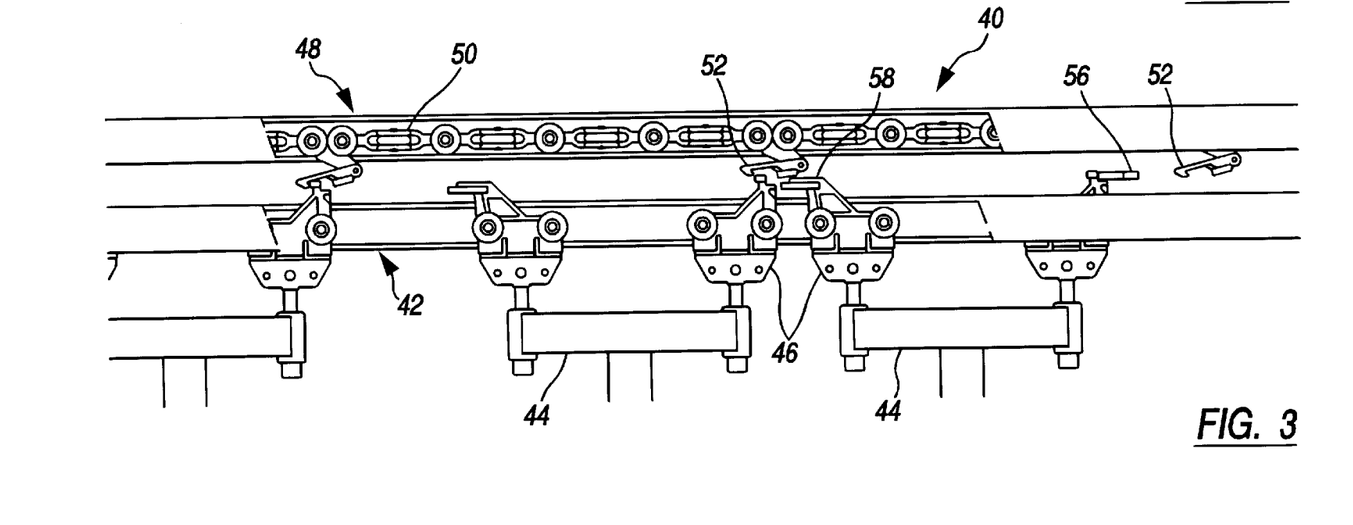
FIG. 3 is another side view of the conveyor section of FIG. 2.

In order for an understanding of the operation of the system 20, it is instructive to refer to FIGS. 2 and 3 wherein sections of a conveyor system are designated generally by the reference numeral 40. This type of system 40 is generally known as a power and free system. In a power and free conveyor system 40, a lower track 42 supports a plurality of carriers 44 on roller assemblies 46. Disposed over the top of and aligned with the lower track 42 is an upper power track 48 having a drive chain 50 supported within it for longitudinal movement. Pivotably connected to the drive chain 50 at regularly spaced intervals are a plurality of pusher dogs 52. The spacing of the tracks 42 and 48 are such that the pusher dogs 52, under the weight of gravity, engage ears 54 of the forward carrier roller assemblies and pull the carriers along the tracks 42. If it is desired to release the carriers 44 from a driven condition, a stop blade 56 may be positioned in the path of the pusher dogs 52 causing the pusher dogs 52 to pivot up and out of engagement with the roller assembly ears 54, thus releasing the carriers 44. As seen in FIG. 3, a tail piece 58 may be mounted to the rear carrier roller assemblies which pivots the pusher dogs 52 again upwardly such that a successive carrier assembly 44 is likewise released. The carrier assemblies 44 are thus disassociated from the drive chain and are thereby in the free mode. It is important to note that in the system 20 of present invention, the conveyor assemblies 22 and 26 are designed to be power and free conveyors while the central conveyor assembly 24 may simply be a conventional continuous flow conveyor.

Figure 4:
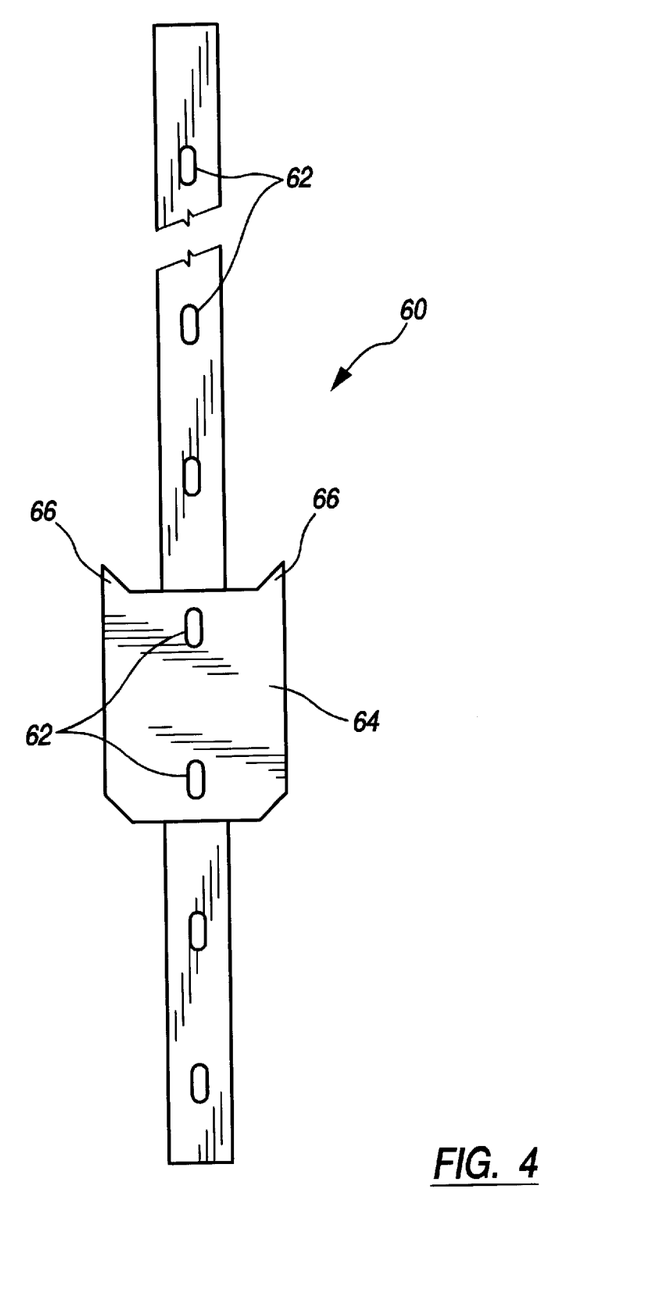
FIG. 4 is a side view of post suitable to be coated in the system of FIG. 1.

Turning now to FIG. 4, an article of manufacture which is most suitable to be loaded on the system 20 for powder coating is a studded T-post designated as 60. The T-post 60 is a widely used member for fence posts, sign posts, and the like. It is typically fabricated from steel and has a general T-shaped cross-section with studs 62 extending from one side. The T-shaped cross-section gives the post 60 considerable strength to resist bending. The studs 62 serve to provide means for securing fencing and other devices to the posts 60 as by suitable wire attachment methods. A common feature of a studded T-post is that it has a guide plate 64 attached to it near its bottom end by simply stamping or riveting a pair of studs 62 inserted into apertures in the plate 64. The plates 64 serve to guide the post 60 without twisting as the post 60 is driven into the ground. Opposed ears 66 may be provided on the plates to serve as attachment means for handling the posts 60 in manufacture.

Figure 5:
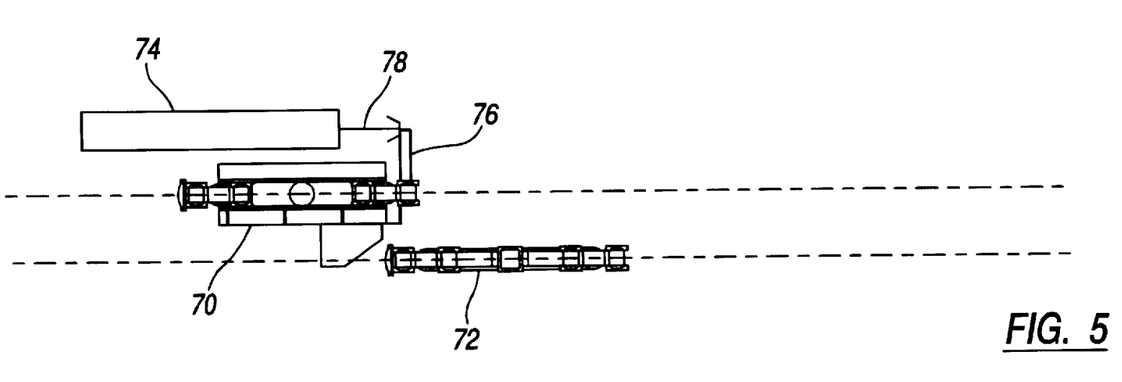
FIG. 5 is a partial top view of conveyor sections showing adjacent carriers of the sections at one stage of orientation ahead of an article transfer station.
Figure 6:
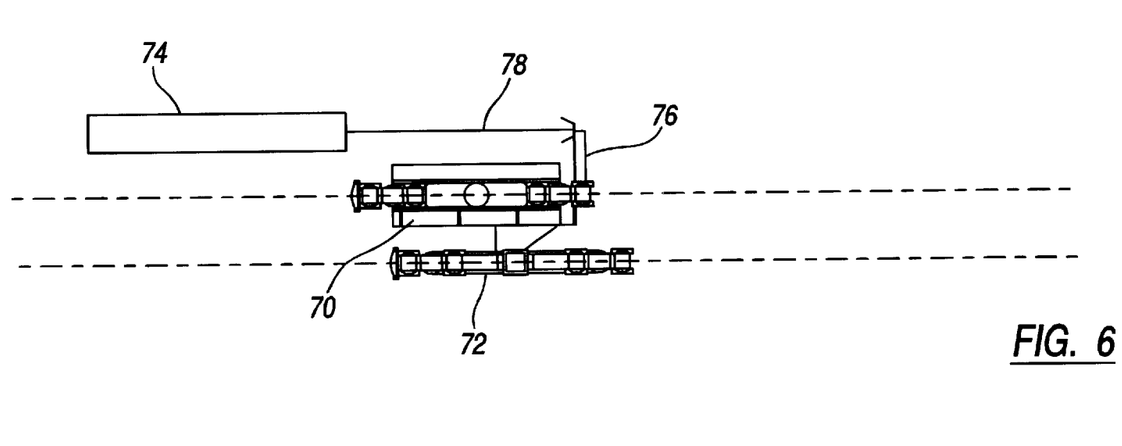
FIG. 6 is a partial top view of the conveyor sections of FIG. 5 showing a second stage of carrier orientation.
Figure 7:
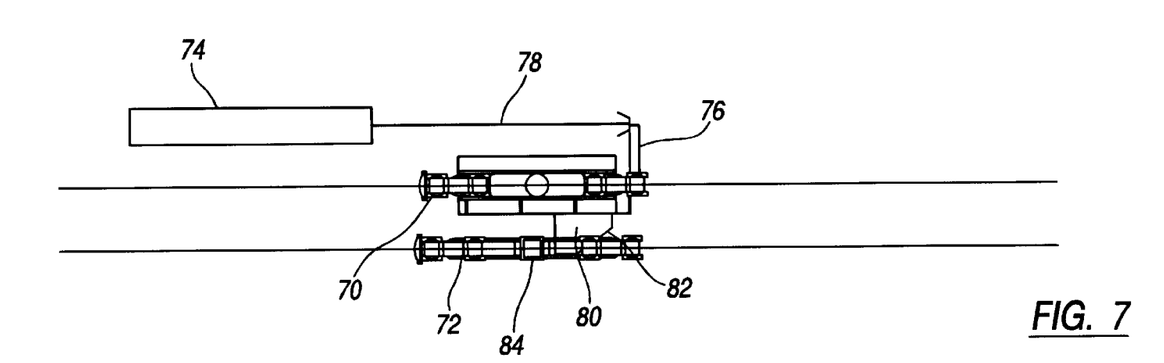
FIG. 7 is a partial top view of the conveyor sections of FIG. 5 showing a third stage of carrier orientation.
Figure 8:
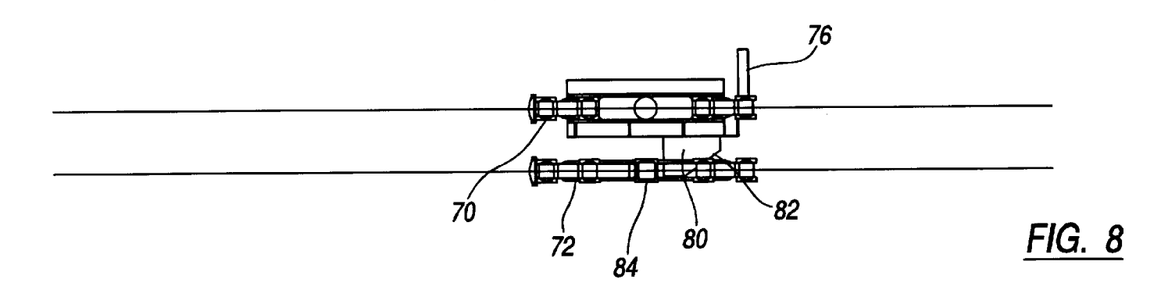
FIG. 8 is a partial top view of the conveyor sections of FIG. 5 showing interengaged alignment of the respective carriers.
Figure 9:
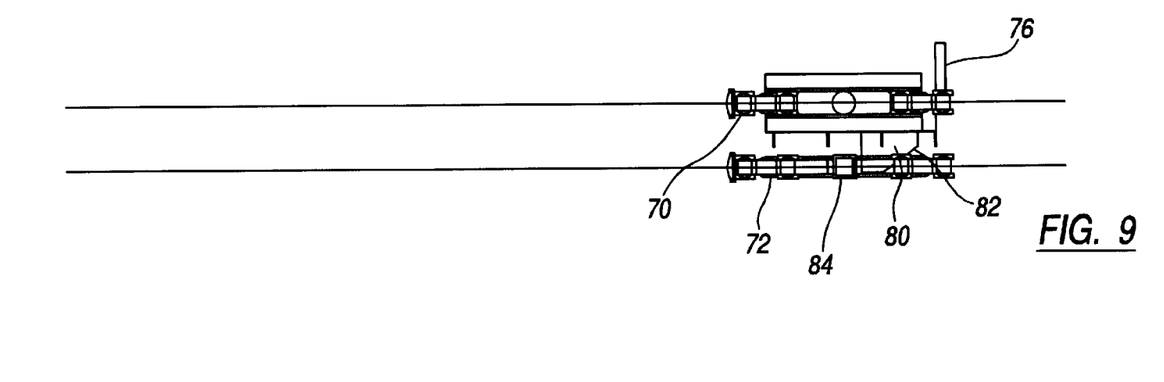
FIG. 9 is a partial top view of the conveyor sections of FIG. 5 showing an initial stage of the article transfer process.
Figure 10:
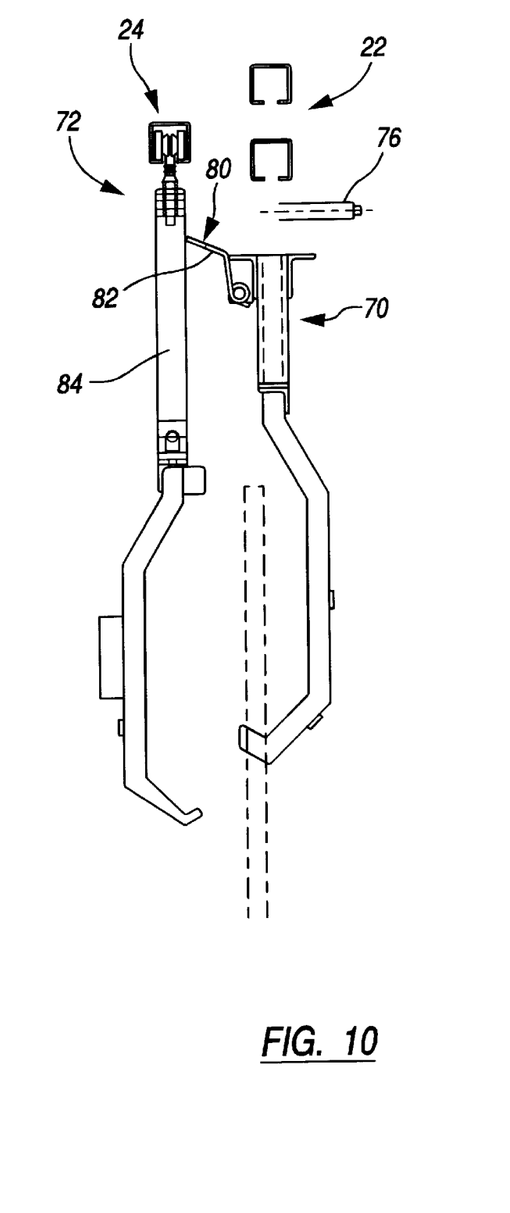
FIG. 10 is an end view of the respective carriers prior to synchronized alignment.
Figure 11:
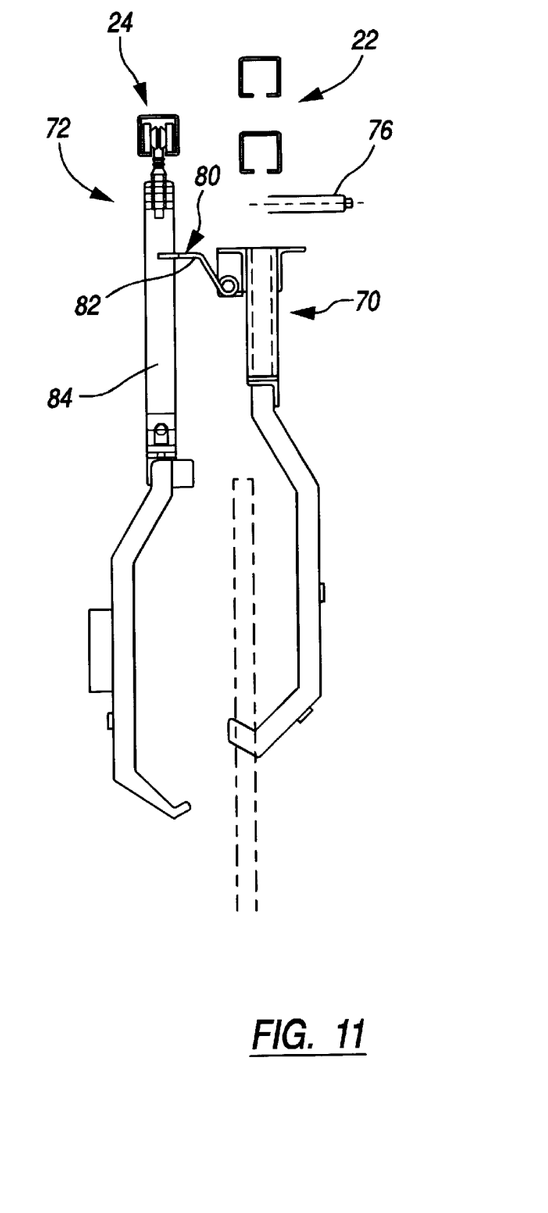
FIG. 11 is an end view of the respective carriers after synchronized interengagement.

As mentioned above, in accordance with a principal feature of the invention, articles are transferred from the conveyor assembly 22 to the conveyor assembly 24 at transfer station A. However, in order to facilitate the transfer, carriers 70 transported by conveyor 22 must be properly synchronized with carriers 72 of conveyor 24. Thus, just ahead of transfer station A and as best seen in FIGS. 5–7, the system 20 includes a pneumatic pusher cylinder 74. Moreover, a carrier 70 which has been dropped by the conveyor assembly 22 and is in a free mode has a trip pin 76 extending horizontally outwardly therefrom. A piston rod 78 of the cylinder 74 engages the trip pin 76 as the carrier 72 of the driven conveyor 24 has passed the carrier 70. The cylinder 74 is then activated to advance the free carrier 70 forwardly along side the driven carrier 72. In a preferred form, the carrier 70 is driven forwardly at a rate of speed just slightly greater than the speed of travel of the carrier 72. As this process takes place, as best seen in FIGS. 10 and 11, a pivotable triangular plate 80 projecting horizontally from the carrier 70 strikes the carrier 72 along inclined edge 82 of the plate 80 whereupon the plate 80 pivots up and around a central vertical tube member 84 of the carrier 72. The plate 80 then pivots by gravity to a rest position as shown in FIG. 11 whereupon the tube member 84 engages the rear edge of the plate 80 such that the driven carrier 72 now pushes the free carrier 70 along the conveyor 22 in a fixed relative disposition as best seen in FIGS. 8 and 9. Synchronization and proper alignment of the two carriers 70 and 72 are now complete.

Figure 12:
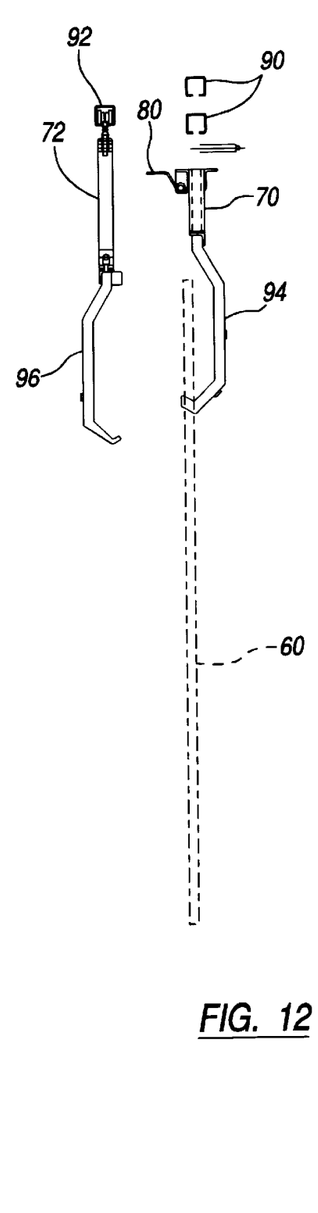
FIG. 12 is an end view showing the respective carriers in one stage of orientation prior to article transfer.
Figure 13:
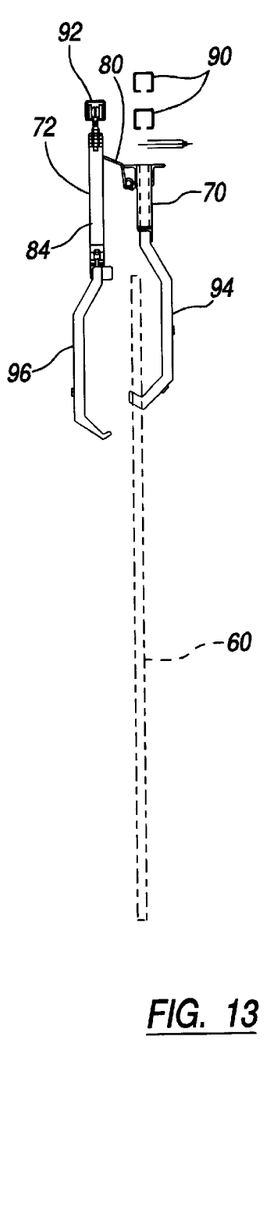
FIG. 13 is an end view showing the respective carriers coming into engagement with one another.
Figure 14:
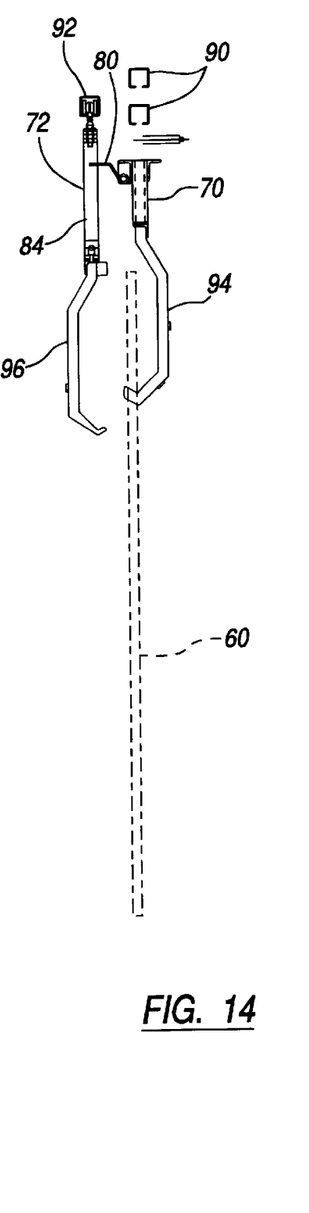
FIG. 14 is an end view showing the respective carriers initially interengaged.

The physical transfer at station A of an article such as the above-described T-post 60 may best be seen with reference to FIGS. 12–19. FIG. 12 shows tracks 90 of the power and free conveyor 22 in a preselected vertical position relative to track 92 of the driven conveyor 24 thereby supporting respective carriers 70 and 72 such that pivoting hook arms 94 of the carrier 70 carry a plurality of T-posts 60 at a predetermined height relative to pivoting hook arms 96 of the carrier 72. The hook arms 96 each engage a preselected ear 66 of the T-post 60 with the T-post hanging upside down from the orientation shown in FIG. 3. The tracks 90 and 92 are maintained at this relative elevation as they come together, as shown in FIG. 13. As heretofore described, the carrier 70 is pushed along side carrier 72 and as seen in FIG. 14, the pivotable plate 80 is engaged by the tube member 84 of the carrier 72.

Figure 15:
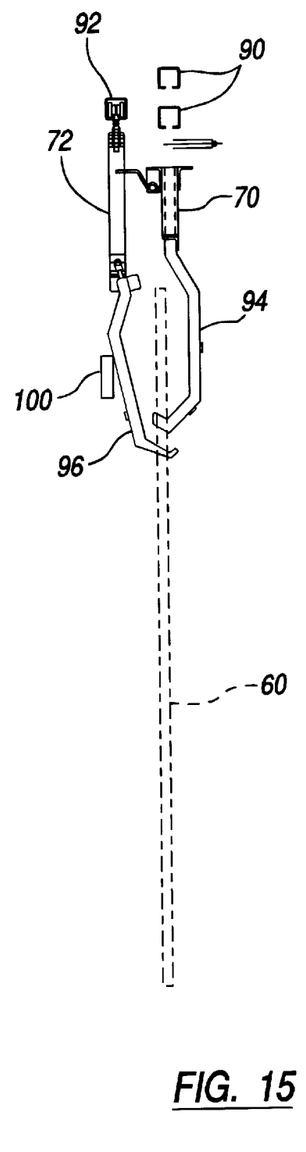
FIG. 15 is an end view showing an initial stage of the article transfer process.
Figure 16:
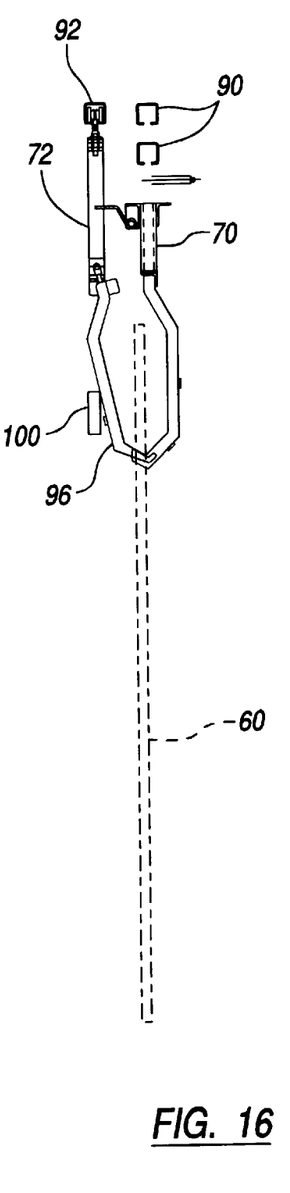
FIG. 16 is an end view showing an intermediate stage of the article transfer process.
Figure 17:
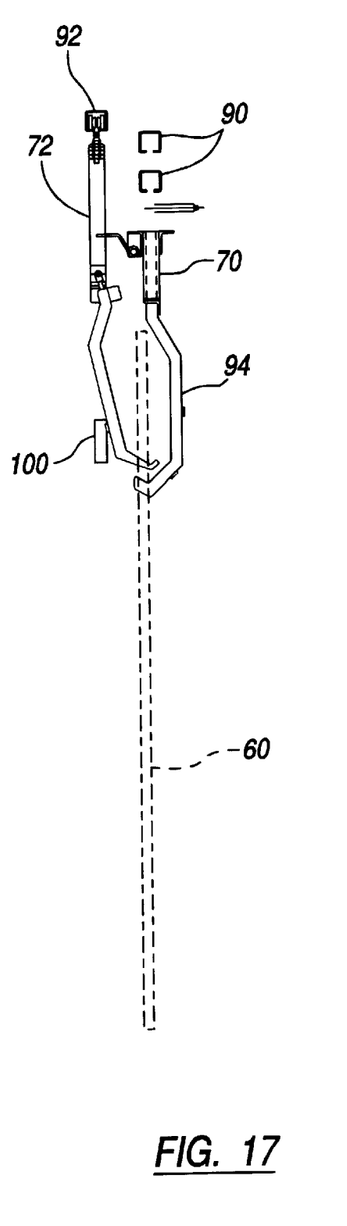
FIG. 17 is an end view showing a final stage of the article transfer process.
Figure 18:
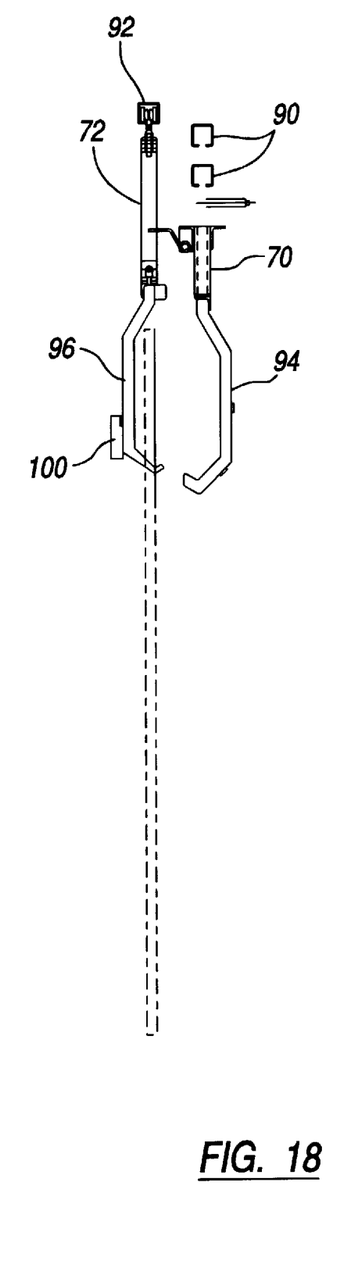
FIG. 18 is an end view showing another final stage of the article transfer process.
Figure 19:
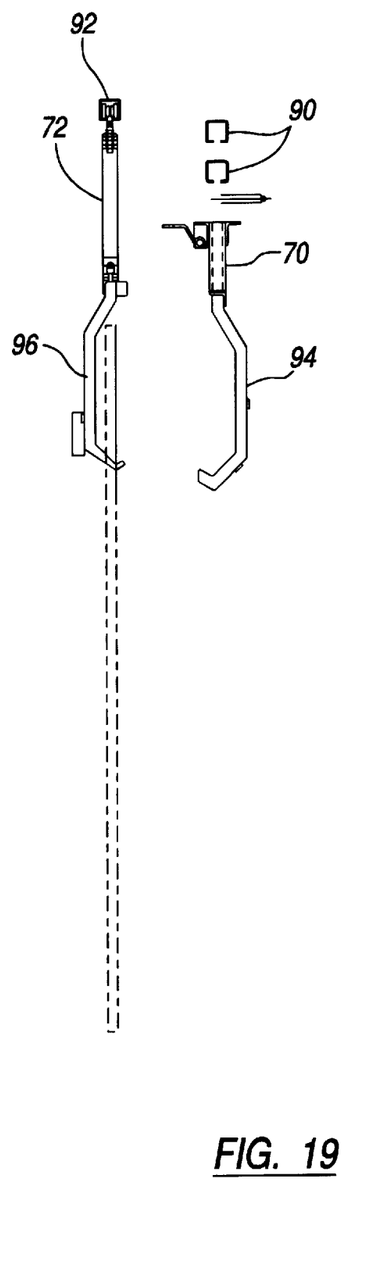
FIG. 19 is an end view showing the completed article transfer process.

Next, as seen in FIG. 15, the pivoting hook arms 96 of carrier 72 engage a horizontal guide rail 100 in the course of their travel which urges the arms 96 to pivot inwardly toward and beneath the arms 94 which carry the T-posts 60. As seen in FIGS. 16 and 17, the track 92 of conveyor 24 then rises relative to the tracks 90 whereupon the arms 96 engage free ears 66 of the T-posts and lift the T-posts 60 off the arms 94. As seen in FIG. 18, the guide rail 100 diverges horizontally outwardly whereupon the hook arms 96 pivot back to a vertical disposition and separate from the hook arms 94 of the conveyor 22. In FIG. 19, the tracks 90 and 92 are shown as separating horizontally and the power chain of the power and free conveyor 22 once again engages the carrier 70 to thereby transport the carrier 70 around its predetermined path. The T-posts 60 are simultaneously transported around the path of the conveyor assembly 24 first through the powder coating booth 34. In practice, it is desirable to construct the tracks 90 and 92 such that both track assemblies 90 and 92 rise as they pass through the transfer station A. This ensures that power free carrier 70 is at all times urged by gravity into engaged relation with the tube 84 of the driven carrier 72. It is also noted that the guide rail 100 may simply be a steel rail which will create some friction with the hook arms 96 of the carrier 72. This modest amount of friction, in practice, helps to stabilize the carriers 70 and 72 as they pass through the transfer station.

Figure 20:
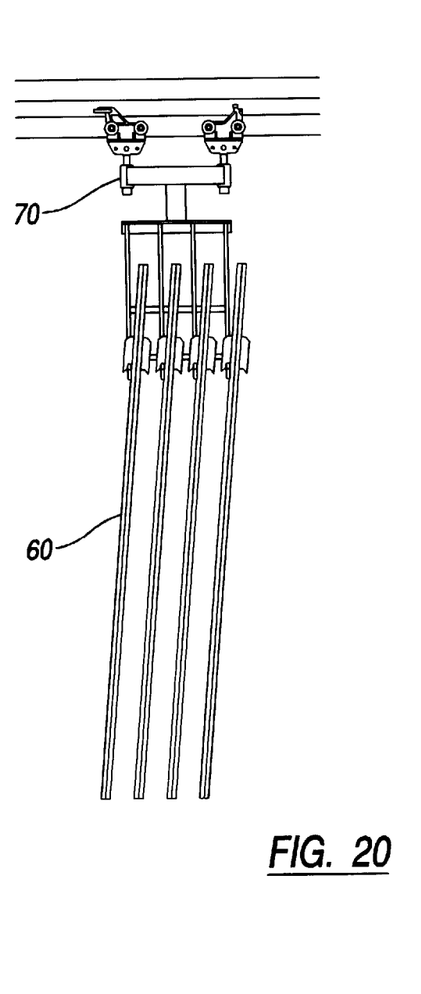
FIG. 20 is a side view showing a free carrier of the first conveyor assembly prior to article transfer.
Figure 21:
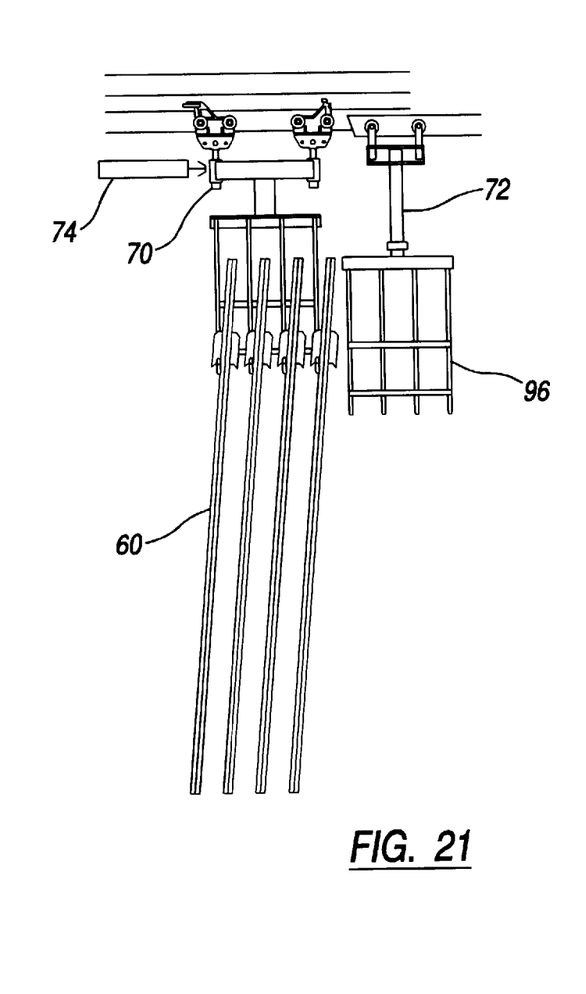
FIG. 21 shows the relative orientation of the respective carriers prior to mutual alignment.
Figure 22:
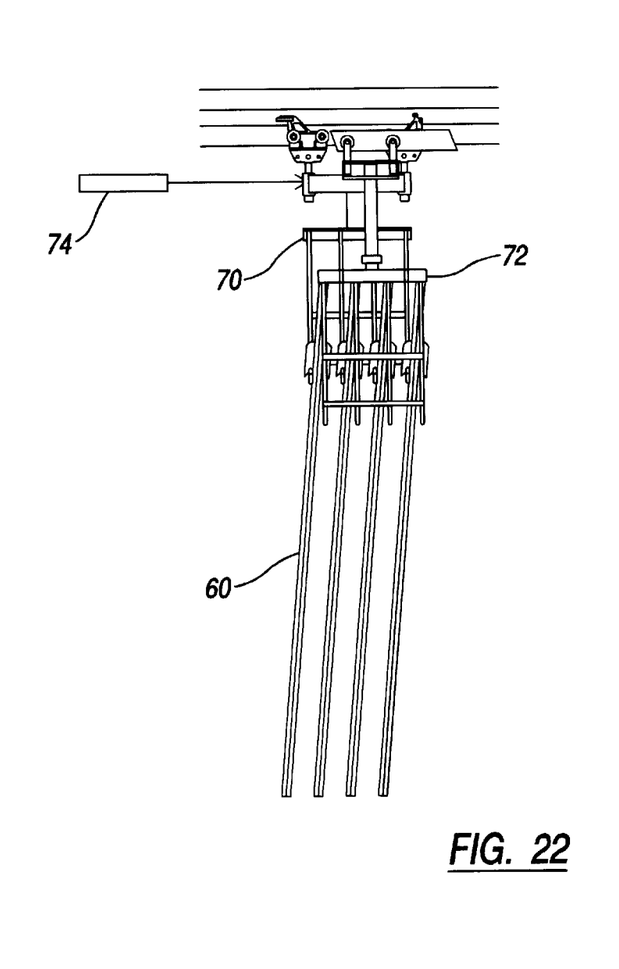
FIG. 22 shows the relative orientation of the respective carriers during the process of alignment.
Figure 23:
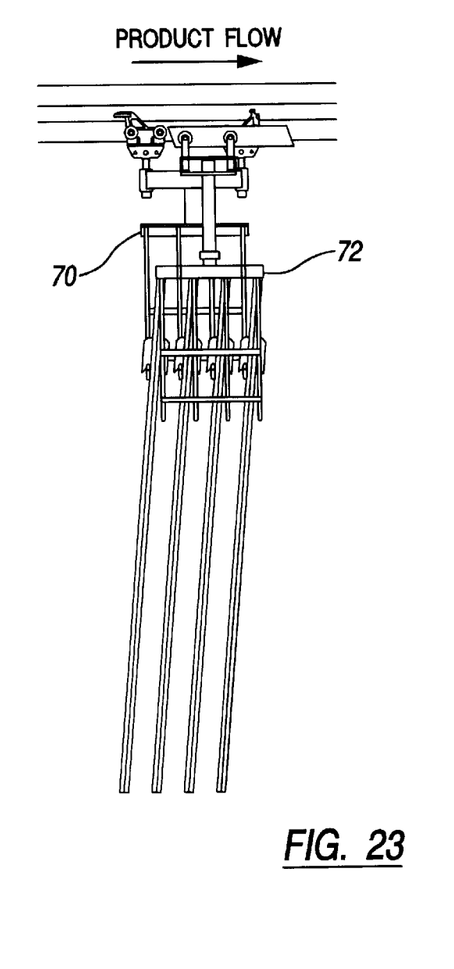
FIG. 23 shows the relative orientation of the respective carriers after the proper alignment.
Figure 24:
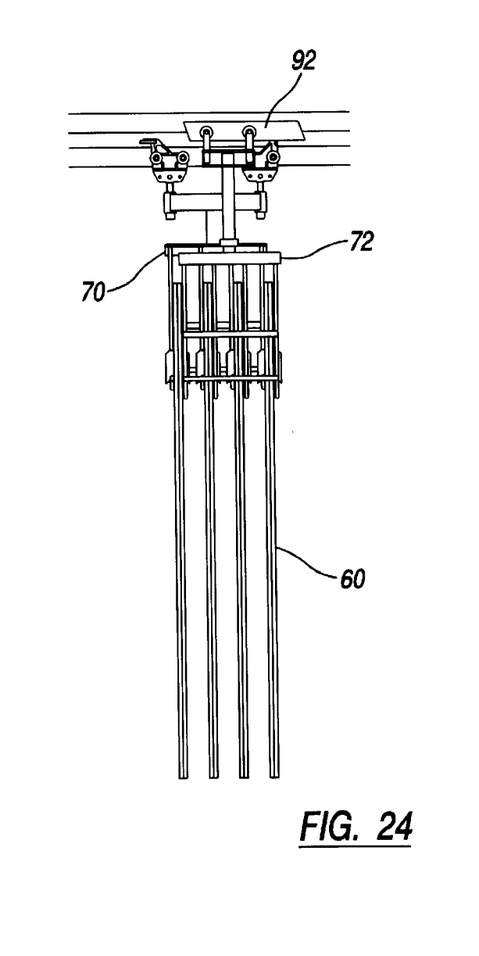
FIG. 24 shows the relative orientation of the respective carriers during one stage of article transfer.
Figure 25:
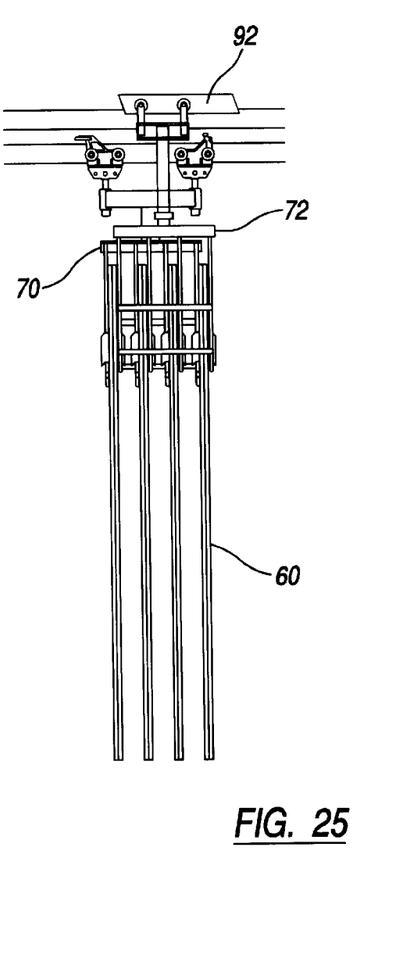
FIG. 25 shows the relative orientation of respective carriers during another stage of the article transfer process.
Figure 26:
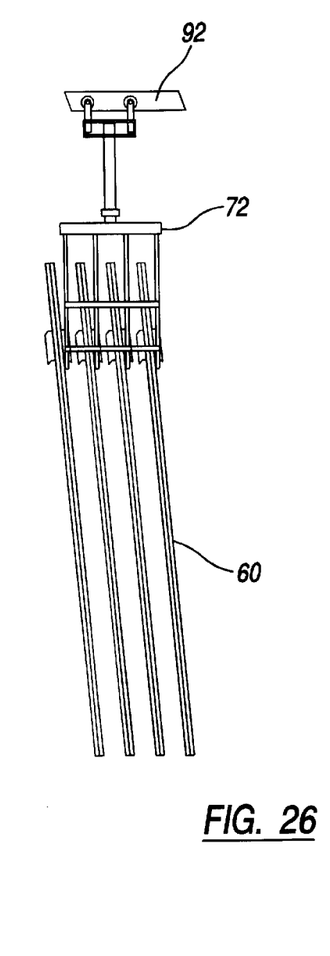
FIG. 26 shows the carrier of the second conveyor assembly after completion of the article transfer process.

The above-described transfer sequence may be better visualized with additional reference to FIGS. 20–26. FIG. 20 shows the carrier 70 supporting a plurality of T-posts 60 at a position released from the power mode of the power and free conveyor assembly 22, just before the transfer station A. FIG. 21 shows the driven carrier 72 having been advanced ahead of the carrier 70. FIG. 22 shows the pusher cylinder 74 activated to drive the carrier 70 into alignment with the carrier 72. FIG. 23 illustrates the aligned carriers 70 and 72 after interengagement and consequent synchronized movement. FIG. 24 shows the carrier 72 moving upwardly relative to carrier 70 such that hook arms 96 of the carrier 72 begin to engage the T-posts 60. FIG. 25 shows the T-posts 60 fully lifted from the hook arms 94 of carrier 70. Finally, FIG. 26 illustrates the completed transfer of T-posts and separation of the carriers 70 and 72.

It can be appreciated that after the carrier 72 has left the powder coating booth 34 and is advanced to transfer station B. A process nearly identical to the transfer process at station A takes place wherein a carrier (not shown) from power and free conveyor assembly 26 is advanced into synchronized movement with carrier 72 and the transfer process proceeds much as heretofore described with respect to transfer station A. Thereafter, the T-posts 60 are transported to bake oven 36, are cooled and are unloaded.

It can now be appreciated that the system 20 of the present invention offers considerable advantages in permitting articles such as T-posts 60 to be powder coated and subsequently baked without baking the residual coating on the associated carrier member. Thus, there is no need to periodically clean the carrier members of accumulated baked-on coating material or otherwise discard them. A suitable powder coating booth 34 may be of a type, for example, manufactured under the name Gema Volstatic with a powder reclaiming feature such that significant economies may be realized in the coating process. Also, the system 20 may be controlled by any number of available process control computers. In one preferred form, the controller synchronizes the respective drive chains of the conveyor assemblies 22, 24 and 26 as to have a maximum out-of-sync variance of on the order of three-quarters of an inch. Such a controller is available from the Allen Bradley Company as a PCC 5 series.

While the system 20 is illustrated in one simplified configuration in FIG. 1, a number of desired configurations of the respective conveyor assemblies 22, 24 and 26 are possible. For example, the assembly 26 may include a section designed to provide extended air cooling of the articles after they leave the bake oven 36. In this connection, the bake oven 36, in practice, may advantageously be designed with infra-red heaters for heating the articles to 500° F. for 45 seconds or so, followed by convection heating at 375° F. for approximately six additional minutes. The system 20 as so constructed is readily capable of moving at a line speed of 34 feet per minute. In the preferred form of the invention, as illustrated throughout the drawings for processing T-posts, the carriers 70 and 72 are designed to hold four posts each although other numbers of posts may be grouped as desired. Thus, at the aforementioned line speed, production rates of 50 to 70 pieces per minute are readily possible.

Figure 27:
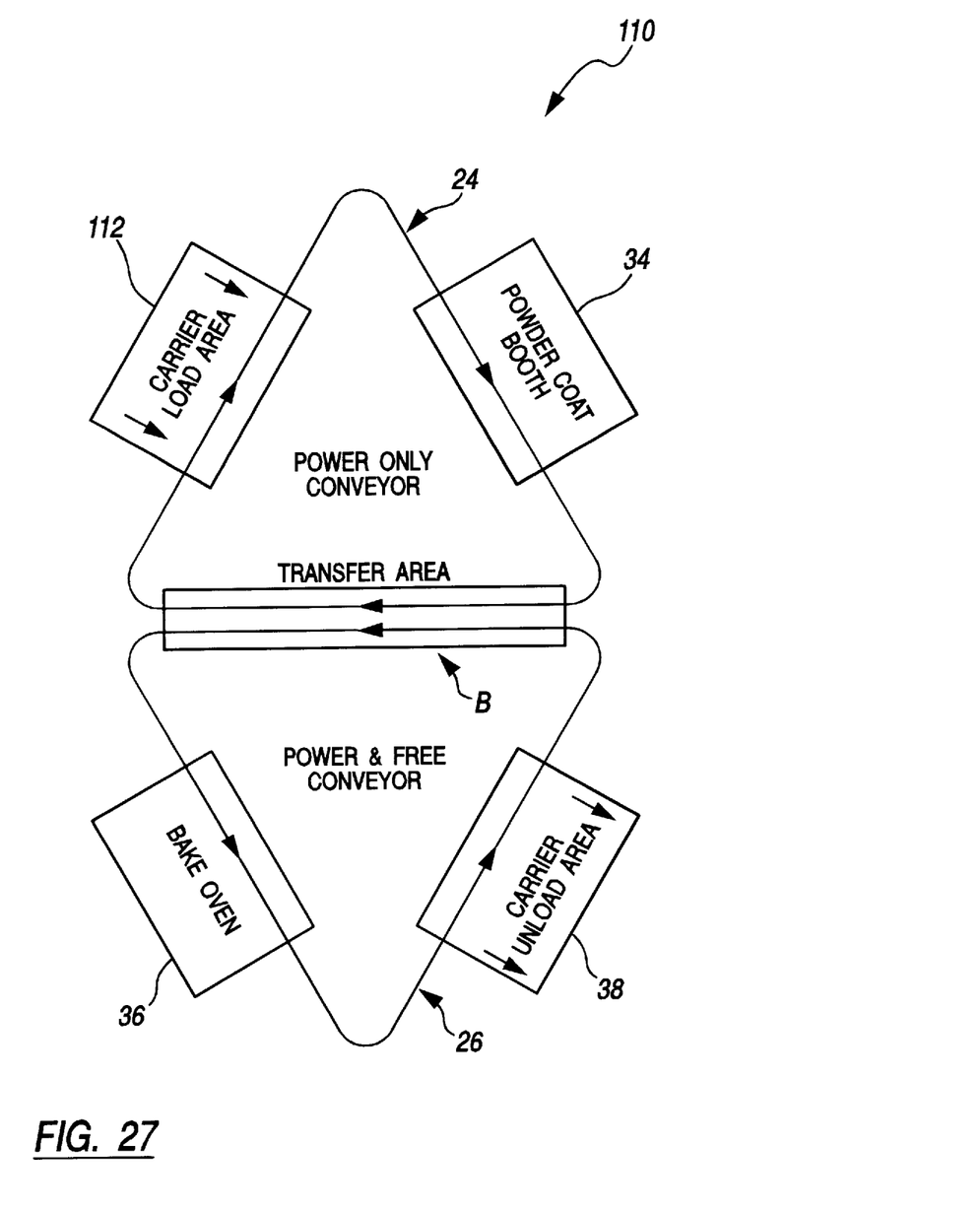
FIG. 27 is a schematic view of an alternative simplified coating system constructed in accordance with the principle of invention.

A simplified version of the system 20 is shown in FIG. 27 and designated generally as 110. In this form of the invention, a carrier load area 112 is positioned directly proximate the power only conveyor 24. Such an arrangement may be used, for example, where the articles to be powder coated are already clean and may thereby be loaded for transfer directly to the powder coat booth 34. Once powder coated, the articles are conveyed, as in system 20, to a transfer area B, then to bake oven 36 and an unloading area 38 by the power and free conveyor 26.

It may also be appreciated that while three conveyor assemblies 22, 24 and 26 have been illustrated as providing a preferred form of the invention, the assembly 22 may in practice be eliminated as a separate system and instead the assembly 24 may be expanded to include loading, washing and drying stations prior to entry of the article into the powder coating booth. However, in this example, there is still a possibility of powder coating deposited on the carriers becoming baked on the carriers in the drying station which would defeat the purpose of the invention. Also, residual powder would be present in the washing station which could also be undesirable. Thus, a three conveyor system is preferred.

Although the present system 20 is shown as processing T-posts 60, it can be appreciated that any number of different articles may be advantageously coated in the system. This can be accomplished by designing suitable carriers to accommodate the geometry and configuration of the various articles as needed. Moreover, the system 20 is suitable for applying surface finishes other than powder coating such as paint finishes or platings.

While the present invention has been described in connection with preferred embodiments thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. A system for applying a coating to an article of manufacture comprising:
   a first conveyor apparatus including a continuous track having carriers suspended therefrom for supporting articles of manufacture and conveying said articles along a portion of an endless first path;
   a second conveyor apparatus including a continuous track having carriers suspended therefrom for supporting articles of manufacture and conveying said articles along a portion of an endless second path;
   a first section of said first conveyor apparatus being longitudinally aligned and positioned in closely spaced relation with a section of said second conveyor apparatus;
   means disposed at said first conveyor section for transferring articles directly from said carriers of said first conveyor apparatus to said carriers of said second conveyor apparatus; and
   apparatus disposed in the path of said second conveyor apparatus for applying a coating on articles transported by second conveyor apparatus;
     wherein an article is successively conveyor along said first conveying apparatus and is transferred from said first conveyor apparatus to said second conveyor apparatus whereupon a coating is applied to said article.

2. The system of claim 1 wherein said first conveyor apparatus has a path passing through a loading station whereat articles are loaded onto the carriers of said first conveyor apparatus.

3. The system of claim 1 wherein said first conveyor apparatus has a path passing through a washer apparatus for cleaning articles transported by said first conveyor apparatus.

4. The system of claim 2 wherein said first conveyor apparatus has a path passing through a dryer apparatus for drying said articles after they have been washed.

5. The system of claim 1 wherein said apparatus for applying said coating is a powder coating means.

6. The system of claim 1 wherein said means for transferring articles from said first conveyor apparatus to said second conveyor apparatus includes a pusher means for aligning a carrier of said second conveyor apparatus with a carrier of said first conveyor apparatus to thereafter facilitate transfer of said article between said carriers.

7. The system of claim 1 wherein said means for transferring articles from said first conveyor apparatus to said second conveyor apparatus includes means for supporting said tracks of said first and second conveyor apparatus such that said track respectively diverge vertically at said longitudinally aligned sections of said first and second conveyor apparatus such that a carrier of said second conveyor apparatus acts to lift an article off of a carrier of said first conveyor apparatus to thereby transfer said article between said first and second conveyor apparatus.

8. The system of claim 1 wherein said means for transferring articles from said first conveyor apparatus to said second conveyor apparatus includes a rail for abutment with one of said respective carriers to align said respective carriers prior to said transfer.

9. The system of claim 7 wherein said respective tracks are both inclined vertically upwardly from horizontal in the direction of article transport along said longitudinally aligned sections.

10. The system of claim 1 wherein said means for transferring articles from said first conveyor apparatus to said second conveyor apparatus includes means for operatively connecting the carrier of said second conveyor apparatus to the carrier of said first conveyor apparatus to maintain said respective carriers in alignment relative to one another.

11. The system of claim 10 wherein said connecting means includes a plate associated with said carrier of said second conveyor apparatus and said plate engages a portion of said carrier of said first conveyor apparatus.

12. The system of claim 11, including a pusher means and said plate being pivotable wherein said pusher means pushes said carrier of said first conveyor apparatus such that said plate slidingly passes said portion of said carrier and thereafter pivots as to be engaged by said portion.

13. The system of claim 7 wherein said article is transported by said first conveyor apparatus by cooperation of said associated carrier with a first portion of said article and said article is lifted from said carrier by engagement of the carrier of said second conveyor apparatus with a second portion of said article.

14. The system of claim 1 wherein said carriers each include hook-shaped members for engaging said articles of manufacture.

15. The system of claim 1 including a third conveyor apparatus having carriers for supporting articles of manufacture and conveying said articles along a third path and further including means for transferring articles from said second conveyor apparatus to said third conveyor apparatus.

16. The system of claim 15 wherein said third conveyor apparatus has a path passing through a bake oven for baking the coating on said article.

17. The system of claim 15 wherein said third conveyor apparatus has a path passing through an unloading station whereat articles are unloaded from said carriers of said third conveyor apparatus.

18. The system of claim 15 wherein a section of said third conveyor apparatus is aligned longitudinally and in closely spaced relation with a second section of said second conveyor apparatus at said means for transferring articles from said second conveyor apparatus to said third conveyor apparatus.

19. A system for applying a coating to an article of manufacture comprising:

a first conveyor apparatus including a continuous track having carriers suspended therefrom for supporting articles of manufacture and conveying said articles along a portion of an endless first path;

apparatus disposed in the first path of said first conveyor apparatus for applying a coating on articles transported by said first conveyor apparatus;

a second conveyor apparatus including a continuous track having carriers suspended therefrom for supporting articles of manufacture and conveying said articles along a portion of an endless second path;

a section of said first conveyor apparatus being longitudinally aligned and in closely spaced relation with a section of said second conveyor apparatus;

means disposed at said sections of said respective first and second conveyor apparatus for transferring articles directly from said carriers of said first conveyor apparatus to said carriers of said second conveyor apparatus; and a bake oven disposed in the path of said second conveyor apparatus for baking said coating on said articles conveyed by said second conveyor apparatus.

20. The system of claim 19 wherein said second conveyor apparatus has a path passing through an unloading station whereat articles are unloaded from said carriers of said second conveyor apparatus after said articles pass through said bake oven.

21. The system of claim 19 including a loading station in the path of said first conveyor apparatus whereat articles are loaded on the carriers of said first conveyor apparatus before being conveyed to said coating apparatus.

* * * * *